United States Patent
Wagle et al.

(10) Patent No.: US 11,827,841 B2
(45) Date of Patent: Nov. 28, 2023

(54) METHODS OF TREATING LOST CIRCULATION ZONES

(71) Applicant: Saudi Arabian Oil Company, Dhahran (SA)

(72) Inventors: Vikrant Wagle, Dhahran (SA); Abdullah Al-Yami, Dhahran (SA); Ali Al Safran, Dhahran (SA); Mohammad Alharthi, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 32 days.

(21) Appl. No.: 17/560,388

(22) Filed: Dec. 23, 2021

(65) Prior Publication Data

US 2023/0203363 A1    Jun. 29, 2023

(51) Int. Cl.
*C09K 8/518* (2006.01)
*E21B 33/138* (2006.01)
*C09K 8/502* (2006.01)

(52) U.S. Cl.
CPC .............. *C09K 8/518* (2013.01); *C09K 8/502* (2013.01); *E21B 33/138* (2013.01)

(58) Field of Classification Search
None
See application file for complete search history.

(56) References Cited

U.S. PATENT DOCUMENTS

| 3,250,330 A | 5/1966 | Smith, Jr. |
| 3,476,189 A | 11/1969 | Bezemer et al. |
| 3,565,176 A | 2/1971 | Wittenwyler |

(Continued)

FOREIGN PATENT DOCUMENTS

| CA | 2709646 A1 | 7/2009 |
| CN | 101451061 A | 6/2009 |

(Continued)

OTHER PUBLICATIONS

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

(Continued)

*Primary Examiner* — Anuradha Ahuja
(74) *Attorney, Agent, or Firm* — DINSMORE & SHOHL LLP

(57) ABSTRACT

A method of treating a lost circulation zone may include positioning a cured lost circulation material composition in the lost circulation zone of a subterranean natural resource well to produce a barrier operable to mitigate wellbore fluids from passing into the lost circulation zone. The cured lost circulation material composition may be a foam comprising a gas phase and a liquid phase. The cured lost circulation material composition may include a cured bisphenol epoxy resin, one or more surfactants positioned at the interface of the liquid phase and the gas phase of the foam and carbon dioxide in the gas phase of the foam. The cured bisphenol epoxy resin may be a reaction product of a bisphenol epoxy resin system including uncured bisphenol epoxy resin, one or more curing agents, and optionally, a diluent. The carbon dioxide may be a reaction product of one or more carbon dioxide gas-generating compounds.

20 Claims, 1 Drawing Sheet

(56) References Cited

U.S. PATENT DOCUMENTS

| | | | |
|---|---|---|---|
| 3,646,999 A | 3/1972 | Hamby, Jr. et al. | |
| 3,915,232 A | 10/1975 | Gruesbeck et al. | |
| 4,003,873 A | 1/1977 | Smith | |
| 4,042,032 A | 8/1977 | Anderson et al. | |
| 4,072,194 A | 2/1978 | Cole et al. | |
| 4,199,484 A | 4/1980 | Murphey | |
| 4,247,430 A | 1/1981 | Constien | |
| 4,665,988 A | 5/1987 | Murphey et al. | |
| 4,730,675 A | 3/1988 | Wygant et al. | |
| 4,749,042 A | 6/1988 | Wu | |
| 4,799,553 A | 1/1989 | Wu | |
| 5,178,218 A | 1/1993 | Dees | |
| 5,712,314 A | 1/1998 | Surles et al. | |
| 5,770,657 A | 6/1998 | Chou et al. | |
| 5,873,413 A | 2/1999 | Chatterji et al. | |
| 5,875,844 A | 3/1999 | Chatterji et al. | |
| 5,875,845 A | 3/1999 | Chatterji et al. | |
| 5,911,282 A | 6/1999 | Onan et al. | |
| 5,959,061 A | 9/1999 | Neumann et al. | |
| 6,016,870 A | 1/2000 | Dewprashad et al. | |
| 6,124,246 A | 9/2000 | Deathman et al. | |
| 6,196,316 B1 | 3/2001 | Bosma et al. | |
| 6,234,251 B1 | 5/2001 | Chatterji et al. | |
| 6,271,181 B1 | 8/2001 | Chatterji et al. | |
| 6,316,529 B1 | 11/2001 | Temme et al. | |
| 6,321,841 B1 | 11/2001 | Eoff et al. | |
| 6,328,106 B1 * | 12/2001 | Griffith | C09K 8/512 166/295 |
| 6,448,206 B1 | 9/2002 | Griffith et al. | |
| 6,450,260 B1 | 9/2002 | James et al. | |
| 6,478,088 B1 | 11/2002 | Hansen et al. | |
| 6,802,375 B2 | 10/2004 | Bosma et al. | |
| 6,837,316 B2 | 1/2005 | Reddy et al. | |
| 6,880,642 B1 | 4/2005 | Garrett et al. | |
| 7,673,686 B2 | 3/2010 | Nguyen et al. | |
| 7,762,329 B1 | 7/2010 | Morgan et al. | |
| 7,926,591 B2 | 4/2011 | Nguyen et al. | |
| 7,956,017 B2 | 6/2011 | Gatlin et al. | |
| 7,975,764 B2 | 7/2011 | Sullivan et al. | |
| 8,157,009 B2 | 4/2012 | Patil et al. | |
| 8,235,116 B1 | 8/2012 | Burts, Jr. et al. | |
| 8,273,426 B1 | 9/2012 | Aramay et al. | |
| 8,307,899 B2 | 11/2012 | Brenneis et al. | |
| 8,664,285 B2 | 3/2014 | Birnbrich et al. | |
| 8,789,595 B2 | 7/2014 | Guerrero et al. | |
| 8,857,515 B2 | 10/2014 | Weaver | |
| 8,936,087 B2 | 1/2015 | Nguyen et al. | |
| 8,944,164 B2 | 2/2015 | Veldman et al. | |
| 8,946,130 B2 | 2/2015 | Zamora et al. | |
| 9,150,775 B2 | 10/2015 | Östvold | |
| 9,321,953 B1 | 4/2016 | Ferrell, Jr. et al. | |
| 9,410,066 B2 | 8/2016 | Ghassemzadeh | |
| 9,550,933 B2 | 1/2017 | Chatterji et al. | |
| 9,701,885 B2 | 7/2017 | Husein et al. | |
| 9,784,079 B2 | 10/2017 | Salla et al. | |
| 9,828,293 B2 | 11/2017 | Yadav et al. | |
| 9,902,891 B2 | 2/2018 | Hundt et al. | |
| 9,932,510 B2 | 4/2018 | Walker et al. | |
| 10,005,930 B2 | 6/2018 | Reddy | |
| 10,081,755 B2 | 9/2018 | Ballard | |
| 10,138,405 B2 | 11/2018 | Kulkarni et al. | |
| 10,144,858 B2 | 12/2018 | Kennedy et al. | |
| 10,280,122 B2 | 5/2019 | Salla et al. | |
| 10,287,480 B1 | 5/2019 | Reddy | |
| 10,344,200 B2 | 7/2019 | Salla et al. | |
| 10,450,495 B2 | 10/2019 | Reddy | |
| 10,526,524 B2 | 1/2020 | Reddy | |
| 10,696,888 B2 | 6/2020 | Al-Yami et al. | |
| 2001/0035111 A1 | 11/2001 | Gienau et al. | |
| 2002/0020530 A1 | 2/2002 | Griffith et al. | |
| 2006/0219405 A1 | 10/2006 | Nguyen et al. | |
| 2007/0093393 A1 | 4/2007 | Navarrete et al. | |
| 2007/0102156 A1 | 5/2007 | Nguyen et al. | |
| 2008/0110624 A1 | 5/2008 | Nguyen et al. | |
| 2008/0115692 A1 * | 5/2008 | Welton | C09K 8/518 106/122 |
| 2008/0277117 A1 | 11/2008 | Burts, Jr. et al. | |
| 2010/0326660 A1 | 12/2010 | Ballard et al. | |
| 2011/0088916 A1 | 4/2011 | Heijnen | |
| 2011/0203795 A1 | 8/2011 | Murphy et al. | |
| 2011/0284247 A1 | 11/2011 | Zamora et al. | |
| 2011/0308799 A1 | 12/2011 | Tarafdar et al. | |
| 2012/0328377 A1 | 12/2012 | Brenneis et al. | |
| 2013/0008654 A1 | 1/2013 | Deville et al. | |
| 2013/0105162 A1 | 5/2013 | Abad et al. | |
| 2013/0178590 A1 | 7/2013 | Jin et al. | |
| 2013/0292116 A1 | 11/2013 | Nguyen et al. | |
| 2014/0027116 A1 | 1/2014 | Suresh et al. | |
| 2014/0076563 A1 | 3/2014 | Lin et al. | |
| 2014/0083702 A1 | 3/2014 | Godfrey et al. | |
| 2014/0367105 A1 | 12/2014 | Karcher et al. | |
| 2015/0152708 A1 | 6/2015 | Smith | |
| 2015/0167424 A1 | 6/2015 | Richards et al. | |
| 2015/0232719 A1 | 8/2015 | Pfeil et al. | |
| 2016/0046853 A1 | 2/2016 | Chatterji et al. | |
| 2016/0194544 A1 | 7/2016 | Jones et al. | |
| 2016/0194548 A1 | 7/2016 | Xie et al. | |
| 2016/0208157 A1 | 7/2016 | Vo et al. | |
| 2016/0272875 A1 | 9/2016 | Ghumare et al. | |
| 2016/0312105 A1 | 10/2016 | Vo et al. | |
| 2016/0362599 A1 | 12/2016 | Wadekar et al. | |
| 2017/0009122 A1 | 1/2017 | Funkhouser et al. | |
| 2017/0130554 A1 | 5/2017 | Jones et al. | |
| 2017/0137562 A1 | 5/2017 | Zheng et al. | |
| 2017/0247607 A1 | 8/2017 | Hundt | |
| 2017/0349804 A1 | 12/2017 | Kellum et al. | |
| 2017/0350212 A1 | 12/2017 | Sabins et al. | |
| 2018/0066489 A1 | 3/2018 | Pipchuk et al. | |
| 2018/0216437 A1 | 8/2018 | Shafer | |
| 2018/0346801 A1 | 12/2018 | Dandawate et al. | |
| 2019/0225875 A1 | 7/2019 | Singh et al. | |
| 2019/0249067 A1 | 8/2019 | Wagle et al. | |
| 2020/0024503 A1 | 1/2020 | Watters et al. | |
| 2021/0040376 A1 | 2/2021 | Devarapalli et al. | |
| 2021/0189219 A1 | 6/2021 | Alanqari et al. | |
| 2022/0056233 A1 | 2/2022 | Wagle et al. | |
| 2022/0073807 A1 | 3/2022 | Wagle et al. | |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A1 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

Foianini et al., "Successful Identification and Bond Assessment of Epoxy-Based Resin Cement Behind Production Casing: Integrating Cementing Technology with New Log Interpretation Methodology To Provide an Innovative Well Integrity Solution", SPWLA 55th Annual Logging Symposium, May 18-22, 2014.

(56) References Cited

OTHER PUBLICATIONS

Moe et al., "Anular pressure buildup: What it is and what to do about it", World Oil Deepwater Technology Supplement, Issue, p. 21-23, Aug. 2000.
Morris et al., "Resin-Based Cement Alternatives for Deepwater Well Construction", Society of Petroleum Engineers, SPE-155613-MS, 2012.
Nelson et al., "Well Cementing Fundamentals", Oilfield Review Summer, vol. 24, No. 2, pp. 59-60, 2012.
International Search Report and Written Opinion dated Mar. 15, 2019 pertaining to International application No. PCT/ JS2018/060282 filed Nov. 12, 2018, 13 pgs.
International Search Report and Written Opinion dated Jun. 21, 2019 pertaining to International application No. PCT/US2019/026882 filed Apr. 11, 2019, 14 pgs.
Office Action dated Sep. 17, 2019 pertaining to U.S. Appl. No. 16/117,902, filed Aug. 30, 2018, 26 pgs.
Office Action dated Sep. 30, 2019 pertaining to U.S. Appl. No. 16/117,974, filed Aug. 30, 2018, 35 pgs.
Office Action dated Nov. 13, 2019 pertaining to U.S. Appl. No. 16/515,673, filed Jul. 18, 2019, 23 pgs.
Office Action dated Nov. 18, 2019 pertaining to U.S. Appl. No. 16/117,950, filed Aug. 30, 2018, 22 pgs.
Cestari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.
Elyas, O. et al. "Use of Polymer Resins for Surface Annulus Isolation Enhancement" SPE-192266-MS, Society of Petroleum Engineers, Apr. 26, 2018, pp. 1-8.
Al-Yami, A. et al. "Optimum Practices to Mitigate Gas Migration Problems in Deep Gas Wells" SPE-187700-MS, Society of Petroleum Engineers, Oct. 18, 2017, pp. 1-21.
Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.
International Search Report and Written Opinion dated Nov. 7, 2019 pertaining to International application No. PCT/US2019/047846 filed Aug. 23, 2019.
International Search Report and Written Opinion dated Nov. 7, 2019 pertaining to International application No. PCT/US2019/047842 filed Aug. 23, 2019.
Final Rejection pertaining to U.S. Appl. No. 16/117,902 dated Jan. 17, 2020.
Final Office Action dated Mar. 10, 2020 pertaining to U.S. Appl. No. 16/117,974, filed Aug. 30, 2018, 39 pgs.
Notice of Allowance and Fee(s) Due dated Mar. 12, 2020 pertaining to U.S. Appl. No. 16/117,950, filed Aug. 30, 2018, 16 pgs.
Office Action dated May 8, 2020 pertaining to U.S. Appl. No. 16/515,673, filed Jul. 18, 2019, 41 pgs.
Office Action dated Jun. 24, 2020 pertaining to U.S. Appl. No. 16/117,974, filed Aug. 30, 2018, 41 pgs.
Examination Report dated May 6, 2020 pertaining to GCC Patent Application No. 2019/37457.
International Search Report and Written Opinion dated Jul. 23, 2020 pertaining to International application No. PCT/US2020/028050 filed Apr. 14, 2020, 15 pgs.
International Search Report and Written Opinion dated Jul. 23, 2020 pertaining to International application No. PCT/US2020/028082 filed Apr. 14, 2020, 15 pgs.
Office Action dated Oct. 6, 2020 pertaining to U.S. Appl. No. 16/809,892, filed Mar. 5, 2020, 44 pgs.
Office Action dated Oct. 6, 2020 pertaining to U.S. Appl. No. 16/809,822, filed Mar. 5, 2020, 44 pgs.
Office Action dated Nov. 17, 2020 pertaining to U.S. Appl. No. 16/117,974, filed Aug. 30, 2018, 46 pgs.
Examination Report dated Aug. 31, 2020 pertaining to GCC Patent Application No. 2019/37457.
Notice of Allowance and Fee(s) Due dated Dec. 10, 2020 pertaining to U.S. Appl. No. 16/809,892, filed Mar. 5, 2020, 14 pgs.
International Search Report and Written Opinion dated Dec. 11, 2020 pertaining to International application No. PCT/US2020/050616 filed Sep. 14, 2020, 13 pgs.
Notice of Allowance and Fee(s) Due dated Dec. 30, 2020 pertaining to U.S. Appl. No. 16/809,822, filed Mar. 5, 2020, 13 pgs.
Office Action dated Jan. 27, 2021 pertaining to U.S. Appl. No. 16/826,989, filed Mar. 23, 2020, 58 pgs.
Office Action dated Jan. 28, 2021 pertaining to U.S. Appl. No. 16/829,470, filed Mar. 25, 2020, 51 pgs.
Office Action dated Feb. 18, 2021 pertaining to U.S. Appl. No. 16/718,716, filed Dec. 18, 2019, 66 pgs.
Office Action dated Mar. 11, 2021 pertaining to U.S. Appl. No. 16/117,974, filed Aug. 30, 2018, 43 pgs.
Office Action dated May 21, 2021 pertaining to U.S. Appl. No. 16/826,989, filed Mar. 23, 2020, 25 pages.
Office Action dated May 25, 2021 pertaining to U.S. Appl. No. 16/829,470, filed Mar. 25, 2020, 25 pages.
Office Action dated May 7, 2021 pertaining to U.S. Appl. No. 16/117,902, filed Aug. 30, 2018, 76 pages.
International Search Report and Written Opinion dated Jun. 1, 2021 pertaining to International application No. PCT/US2021/018660 filed Feb. 19, 2021, 14 pages.
U.S. Office Action dated Jul. 23, 2021 pertaining to U.S. Appl. No. 16/718,716, filed Dec. 18, 2019, 28 pages.
Notice of Allowance and Fee(s) Due dated Aug. 12, 2021 pertaining to U.S. Appl. No. 16/117,974, filed Aug. 30, 2018, 14 pages.
Notice of Allowance and Fee(s) Due dated Aug. 3, 2021 pertaining to U.S. Appl. No. 16/826,989, filed Mar. 23, 2020, 14 pages.
Notice of Allowance and Fee(s) Due dated Aug. 5, 2021 pertaining to U.S. Appl. No. 16/829,470, filed Mar. 25, 2020, 12 pages.
U.S. Office Action dated Oct. 12, 2021 pertaining to U.S. Appl. No. 16/718,716, filed Dec. 18, 2019, 21 pages.
U.S. Office Action dated Oct. 13, 2021 pertaining to U.S. Appl. No. 16/515,673, filed Jul. 18, 2019, 64 pages.
U.S. Office Action dated Nov. 3, 2021 pertaining to U.S. Appl. No. 16/906,607, filed Jun. 19, 2020, 92 pages.
U.S. Office Action dated Feb. 14, 2022 pertaining to U.S. Appl. No. 16/515,673, filed Jul. 18, 2019, 22 pages.
U.S. Notice of Allowance and Fee(s) Due dated Feb. 7, 2022 pertaining to U.S. Appl. No. 16/718,716, filed Dec. 18, 2019, 13 pages.
U.S. Office Action dated Sep. 10, 2021 pertaining to U.S. Appl. No. 16/718,784, filed Dec. 18, 2019, 81 pages.
U.S. Notice of Allowance and Fee(s) Due dated Feb. 9, 2022 pertaining to U.S. Appl. No. 16/117,902, filed Aug. 30, 2018, 15 pages.
U.S. Notice of Allowance and Fee(s) Due dated Mar. 4, 2022 pertaining to U.S. Appl. No. 16/906,607, filed Jun. 19, 2020, 9 pages.
Examination Report pertaining to Application No. GC-2019-37457 dated Aug. 31, 2020.
U.S. Office Action dated Sep. 7, 2021 pertaining to U.S. Appl. No. 16/117,902, filed Aug. 30, 2018, 29 pages.
U.S. Office Action dated Oct. 6, 2020 pertaining to U.S. Appl. No. 16/809,892, filed Mar. 5, 2020, 44 pages.
U.S. Office Action dated Feb. 3, 2022 pertaining to U.S. Appl. No. 16/718,784, filed Dec. 18, 2019, 21 pages.

* cited by examiner

METHODS OF TREATING LOST CIRCULATION ZONES

TECHNICAL FIELD

Embodiments of the present disclosure generally relate to natural resource well drilling and, more specifically, to methods for treating lost circulation zones of a wellbores.

BACKGROUND

Extracting subterranean hydrocarbons may require drilling a hole from the surface to the subterranean geological formation housing the hydrocarbons. Specialized drilling techniques and materials are utilized to form the wellbore hole and extract the hydrocarbons. Specialized materials utilized in drilling operations include drilling fluids and materials for sealing the casing-casing annulus of the wellbore, which may be formulated for specific downhole conditions. A wellbore is a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore.

During drilling of a wellbore, cementing the wellbore, or both, lost circulation zones may be encountered which result in loss of drilling fluids, cementing compositions, or other fluids. In a lost circulation zone, the drilling fluids, cement compositions, or other fluids flow out of the wellbore and into the surrounding formation. Depending on the extent of fluid volume losses, lost circulation is classified as seepage loss, moderate loss, or severe loss. For oil-based fluids, losses of 10-30 barrels per hour are considered moderate, and losses greater than 30 barrels per hour are considered severe. For water-based fluids, losses between 25 and 100 barrels are considered moderate, and losses greater than 100 barrels are considered severe. For severe losses, the dimensions of the lost circulation zones cannot be estimated which makes it difficult to design loss circulation treatment pills based on the sized particles. Lost circulation zones may increase the cost of the well through increased material costs to replace lost fluids and downtime to remediate the lost circulation zone.

SUMMARY

Lost circulation zones may be remediated by introducing a lost circulation material (referred to sometimes herein as an "LCM") into the lost circulation zone to seal off the lost circulation zone to prevent further fluid loss. An ongoing need exists for lost circulation materials for treating lost circulation zones encountered during resource well drilling. According to one or more embodiments described herein, LCM compositions may comprise cured bisphenol epoxy resins, surfactants, and carbon dioxide. The LCM compositions may form a foam that creates a barrier to prevent drilling fluids at a pressure greater than the formation pressure from flowing out of the wellbore and into the formation. One or more surfactants may be positioned at the interface of a liquid phase and a gas phase of the foam. Carbon dioxide may be in the gas phase of the foam. The cured bisphenol epoxy resin may be a reaction product of a bisphenol epoxy resin system, which comprises uncured bisphenol epoxy resin, a curing agent, and optionally, a diluent. Volume adaptability is introduced in the LCM compositions through in-situ generation of carbon dioxide gas as a result of the decomposition of a carbon dioxide gas-generating compound during formation of the LCM compositions. The LCM compositions disclosed herein may exhibit greater effectiveness at preventing fluid loss in a formation due to volume expansion of the LCM composition upon curing compared to conventional, non-expanding LCM compositions.

In one or more embodiments, a method of treating a lost circulation zone may comprise positioning a cured lost circulation material composition in the lost circulation zone of a subterranean natural resource well to produce a barrier operable to mitigate wellbore fluids from passing into the lost circulation zone. The cured lost circulation material composition may be a foam comprising a gas phase and a liquid phase. The cured lost circulation material composition may comprise a cured bisphenol epoxy resin, one or more surfactants positioned at the interface of the liquid phase and the gas phase of the foam, and carbon dioxide in the gas phase of the foam. The cured bisphenol epoxy resin may be a reaction product of a bisphenol epoxy resin system comprising uncured bisphenol epoxy resin, one or more curing agents, and optionally, a diluent. The carbon dioxide may be a reaction product of one or more carbon dioxide gas-generating compounds.

Additional features and advantages of the described embodiments will be set forth in the description of drawings and detailed description which follows, and in part will be readily apparent to those skilled in the art from that description or recognized by practicing the described embodiments, including the detailed description which follows as well as the claims.

DESCRIPTION OF DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
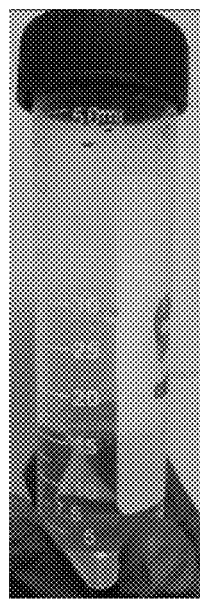
FIG. 1 shows an image of a comparative example epoxy resin composition.

Embodiments of the present disclosure are directed to lost circulation material (LCM) compositions. The LCM compositions of the present disclosure, used for treating lost circulation zones in subterranean natural resource wells, may comprise a cured bisphenol epoxy resin, a surfactant, and carbon dioxide. The LCM compositions may be a foam, comprising a gas phase and liquid phase wherein the surfactants are positioned at the interface of the liquid phase and the gas phase of the foam, and the carbon dioxide is in the gas phase of the foam. As used throughout this disclosure, the term "foam" may refer to a mass of small bubbles formed on or in a liquid. Volume adaptability is introduced in the LCM compositions through in situ generation of carbon dioxide gas due to decomposition of a carbon dioxide gas-generating compound under downhole conditions, such as elevated temperatures. The expandable nature of the LCM compositions allows the LCM compositions to adapt in volume to effectively seal a wide range of fractures with unknown dimensions in subterranean formations.

As used throughout this disclosure, the term "lost circulation zone" may refer to an area encountered during drilling operations where the volume of drilling fluid returning to the surface is less than the volume of drilling fluid introduced to the wellbore. The lost circulation zone may be due to any kind of opening between the wellbore and the subterranean formation. As used throughout this disclosure, the term "subterranean natural resource well" may refer to a geologic region containing hydrocarbons, such as crude oil, hydrocarbon gases, or both, which may be extracted from the subterranean geologic region. Lost circulation zones that can be addressed by LCM compositions described herein and may range from seepage loss to complete fluid loss. As used throughout this disclosure, the term "lost circulation material" may refer to any material that may be used to treat a lost circulation zone.

The embodiments described herein may have advantages over conventional lost circulation remediation techniques. For example, cement compositions, such as reduced-cure-time cements, have been used to treat lost circulation zones to seal off the lost circulation zone from the wellbore. However, during subsequent continued drilling of the wellbore and hydrocarbon production using the well, conventional cement compositions injected and cured to isolate lost circulation zones may be subjected to ongoing temperature and pressure cycling. This temperature and pressure cycling may cause micro-cracks to form in the cured cements. Fluids, such as gas or liquids, may migrate through these micro-cracks, eventually resulting in additional loss of fluids to the lost circulation zone.

As described herein, epoxy resin-based materials may be incorporated into LCM compositions for treating lost circulation zones, which may reduce or eliminate the cracking in conventional lost circulation zone treatments caused by continued temperature and pressure cycling. As used throughout this disclosure, the term "epoxy resin" may refer to both a prepolymer and polymer containing epoxide groups. The epoxy resin based materials, once cured, may be more resistant to formation of micro-cracks caused by thermal and pressure cycling of the wellbore compared to conventional cements. However, one reason why lost circulation is difficult to remedy is lack of precise information on the dimensions of loss circulation areas, which can range from microfractures to vugular zones, thus leading to an improper selection of suitable plugging materials that can adapt, in both volume and shape, to effectively plug a wide range of fractures with unknown dimensions. Traditional lost circulation materials, such as non-reactive particulate or fiber based or settable fluids, when applied in insufficient quantities, cannot effectively seal a high permeability zone. Thus, there is a need for a composition that is adaptable in volume in order to effectively seal a wide range of fractures with unknown dimensions.

The embodiments described herein of the LCM compositions may provide a foamed, space-filling epoxy resin, capable of plugging the pores of the formation to reduce fluid loss more effectively than conventional, non-foaming LCM compositions. The foamed LCM compositions of the present disclosure can be used to mitigate (reduce or eliminate) loss circulation in a subterranean formation, such as a wellbore. Thus, also provide in the present disclosure are methods of controlling loss circulation using the LCM compositions. In some embodiments, the LCM compositions decreases the amount of LCM required to plug vugular zones as compared to traditional lost circulation materials that are not able to expand and adapt in volume. Thus, the LCM compositions of the present disclosure can be used to cure the losses in vugular zones while using less material than traditional LCMs.

According to one or more aspects of the present disclosure, the LCM compositions for treating lost circulation zones in a wellbore may comprise a cured bisphenol epoxy resin, wherein the cured bisphenol epoxy resin is a reaction product of a bisphenol epoxy resin system. As used in this disclosure, the term "epoxy resin system" may refer to the constituents that react to form the cured epoxy resin and may comprise but are not limited to the epoxy resins, reactive and non-reactive diluents, and curing agents. The "epoxy resin system" may generally exclude weighting materials, emulsifiers, and components and additives that do not participate in the polymerization reaction of the epoxy system. In the present disclosure, surfactants are treated as separate constituents of the LCM compositions but may be considered part of the epoxy resin system in some embodiments. As used throughout this disclosure, the term "cured epoxy resin" may refer to a polymer containing epoxide groups after crosslinking.

In some embodiments, the cured epoxy resin of the LCM composition may comprise bisphenol-based epoxy resins such as but not limited to, bisphenol-A-based epoxy resins, bisphenol-F-based epoxy resins, or combinations thereof.

In some embodiments, the LCM composition may comprise a plurality of cured epoxy resins. The LCM composition may comprise a combination of two or more of bisphenol-A-based epoxy resins or bisphenol-F-based epoxy resins. In one or more embodiments, the cured epoxy resin of the LCM composition may comprise two or more of bisphenol-A-epichlorohydrin epoxy resin, 2,2'-[(1-methylethylidene)bis(4,1-phenyleneoxymethylene)]bisoxirane epoxy resin, or combinations of these.

In some embodiments, the LCM composition comprises a cured bisphenol epoxy resin that comprises bisphenol-A-epichlorohydrin epoxy resin, 2,2'-[(1-methylethylidene)bis(4,1-phenyleneoxymethylene)]bisoxirane, or combinations of these.

The cured epoxy resin of the LCM composition may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

In some embodiments, the cured epoxy resin of the LCM composition may be modified with a reactive diluent. The type and amount of reactive diluent may influence the flexibility, hardness, chemical resistance, mechanical properties, plasticizing effect, reactivity, crosslinking density, or other properties of the epoxy resin. The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. A functional reactive diluent may have one, two, three, or more than three epoxide functional groups. The term "non-functional", as used in relation to reactive diluents, refers to a reactive diluent that does not have at least one epoxide functional group. Thus, a non-functional reactive diluent does not have at least one epoxide functional group, but may still participate in at least one chemical reaction during cross-linking of the epoxide resin. The term "non-reactive diluent" may refer to a diluent that does not participate in a chemical reaction during cross-linking of the epoxy resin. Examples of reactive diluents may comprise glycidyl ethers. Glycidyl ethers may comprise alkyl glycidyl ethers, aromatic glycidyl ethers, or both. Glycidyl ethers may have chemical formula (I):

$$R^1-O-CH_2-(C_2H_3O) \tag{I}$$

where $R^1$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^1$ may be a branched, linear, or cyclic alkyl. In some embodiments, $R^1$ may comprise one or more substituted or unsubstituted aromatic rings.

In some embodiments, the diluent may comprise diglycidyl ethers. Diglycidyl ethers may have chemical formula (II):

$$(OC_2H_3)-CH_2-O-R^2-O-CH_2-(C_2H_3O) \tag{II}$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^2$ may comprise one or more substituted or unsubstituted aromatic rings. In some embodiments, $R^2$ may be an alkyl group or cycloaklyl group. For example, in some embodiments, the diluent may comprise 1,6-hexanediol diglycidyl ether, which has chemical formula (III):

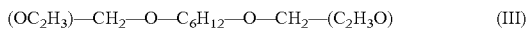

$$(OC_2H_3)-CH_2-O-C_6H_{12}-O-CH_2-(C_2H_3O) \tag{III}$$

In some embodiments, the epoxy resin of the LCM composition may comprise a diluent having the formula (IV):

$$R^3-O-CH_2-(C_2H_3O) \tag{IV}$$

where $R^3$ may be a linear or branched hydrocarbyl having from 12 to 14 carbon atoms. $R^3$ may be linear, branched, or cyclic. In some embodiments, $R^3$ may be an alkyl group. In some embodiments, $R^3$ is an alkyl group having from 12 to 14 carbon atoms. In some embodiments, the epoxy resin system may comprise a diluent oxirane mono [$(C_{12}-C_{14})$-alkyloxy)methyl] derivatives.

In one or more embodiments, the epoxy resin of the LCM composition may comprise a cured bisphenol epoxy resin. In one or a plurality of embodiments, the cured bisphenol epoxy resin may be bisphenol-A-(epichlorohydrin) epoxy resin. The bisphenol-A-epichlorohydrin epoxy resin may refer to an epoxy resin made by reaction of bisphenol-A and epichlorohydrin. In some embodiments, the bisphenol-A-(epichlorohydrin) epoxy resin may be modified with a diluent. In some embodiments, the epoxy resin may comprise a bisphenol-A-(epichlorohydrin) epoxy resin modified with a diluent. In some embodiments, the cured epoxy resin may comprise a bisphenol-A-(epichlorohydrin) epoxy resin with oxirane mono [$(C_{12}-C_{14}$ alkyloxy)methyl] derivatives. The bisphenol-A-(epichlorohydrin) epoxy resin with oxirane mono [$(C_{12}-C_{14})$-alkyloxy) methyl] derivatives may provide the LCM compositions with improved mechanical and chemical resistance compared to LCM compositions with the bisphenol-A-(epichlorohydrin) epoxy resin without the reactive diluent oxirane mono [$(C_{12}-C_{14})$-alkyloxy) methyl] derivatives.

In one or more embodiments, the epoxy resin comprising the bisphenol-A-(epichlorohydrin) epoxy resin with the reactive diluent oxirane mono [$(C_{12}-C_{14})$-alkyloxy) methyl] derivatives may have an epoxy value of from 4.76 epoxy equivalents per kilogram of epoxy resin to 5.26 epoxy equivalents per kilogram of epoxy resin. The epoxy resin comprising the bisphenol-A-(epichlorohydrin) epoxy resin with the reactive diluent oxirane mono [$(C_{12}-C_{14})$-alkyloxy) methyl] derivatives may have an epoxy equivalent weight of 190 g/eq to 210 g/eq.

In one or more embodiments, the epoxy resin of the LCM composition may comprise a cured bisphenol epoxy resin. In one or more embodiments, the cured bisphenol epoxy resin may be 2,2'-[(1-methylethylidene)bis(4,1-phenyleneoxymethylene)]bisoxirane. The 2,2'-[(1-methylethylidene)bis(4,1-phenyleneoxymethylene)]bisoxirane epoxy resin may additionally be modified with a reactive diluent, such as 1,6 hexanediol diglycidyl ether. In some embodiments, the cured epoxy resin may comprise 2,2'-[(1-methylethylidene)bis(4,1-phenyleneoxymethylene)]bisoxirane epoxy resin with the reactive diluent 1,6 hexanediol diglycidyl ether.

As previously noted, the LCM compositions of the present disclosure may comprise one or more surfactants, wherein the surfactant is positioned at the interface of the liquid phase and the gas phase of the LCM composition. As used throughout this disclosure, the term "surfactant" may refer to a substance that reduces the surface tension of a liquid in which it is dissolved. Any type of surfactant can be used in the LCM compositions of the present disclosure, which may comprise, but are not limited to cationic surfactants, anionic surfactants, amphoteric (zwitterionic) surfactants, nonionic surfactants, and combinations thereof.

Examples of suitable surfactants that can be used in the LCM compositions of the present disclosure include, but are not limited to, alkyl polyglycol ethers, alkylaryl polyglycolethers, ethylene oxide/propylene oxide (EO/PO) block copolymers, fatty acid polyglycol esters, polyglycol ethers of hydroxyl-containing triglycerides (for example, castor oil), alkylpolyglycosides, fatty esters of glycerol, sorbitol, or pentaerythritol, amine oxides (for example, dodecyldimethylamine oxide), alkyl sulfates, alkyl ether sulfates, sulfonates, for example, alkyl sulfonates and alkylaryl sulfonates, alkali metal salts or ammonium salts of a carboxylic acid or poly(alkylene glycol) ether carboxylic acid, partial phosphoric esters or the corresponding alkali metal salt or ammonium salt, for example, an alkyl and alkaryl phosphate, an alkylether phosphate, or an alkarylether phosphate, salts of primary, secondary, or tertiary fatty amines, quaternary alkyl- and alkylbenzylammonium salts, alkylpyridinium salts, alkylimidazolinium salts, alkyloxazolinium salts, sultaines (for example, cocamidopropyl hydroxysultaine), betaines (for example, cocamidopropyl betaine), phosphates (for example, lecithin), and combinations thereof.

Examples of anionic surfactants that can be used in the LCM compositions of the present disclosure include, but are not limited to, an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, an ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Examples of cationic surfactants that can be used in the LCM compositions of the present disclosure include, but are not limited to, octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Examples of amphoteric (zwitterionic) surfactants that can be used in the LCM compositions of the present disclosure include, but are not limited to, 3[(3-cholamidopropyl)dimethylammonio]-1-propanesulfonate (CHAPS), cocamidopropyl hydroxysultaine, ocamidopropyl betaine, phospholipids, and sphingomyelins. In some embodiments, the surfactant is a hydroxysultaine. In some embodiments, the surfactant is cocamidopropyl hydroxysultaine.

Examples of nonionic surfactants that can be used in the LCM compositions of the present disclosure include, but are not limited to, long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycol alkyl ethers, such as octaethylene glycol monododecyl ether and pentaethylene glycol monododecyl ether; polypropylene glycol alkyl ethers; glucoside alkyl ethers, such as decyl glucoside, lauryl glucoside, and octyl glucoside; polyethylene glycol octylphenyl ethers, such as Triton X-100; polyethylene glycol alkylphenyl ethers, such as nonoxynol-9; glycerol alkyl esters, such as glyceryl laurate; polyoxyethylene glycol sorbitan alkyl esters, such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

In one or more embodiments, the LCM composition is a cured foam comprising a gas phase and a liquid phase. In one or more embodiments, carbon dioxide may be in the gas phase of the foam, wherein the carbon dioxide is a reaction product of a carbon dioxide gas-generating compound.

In one or more embodiments, the LCM compositions may comprise other modifiers, such as but not limited to cardanol liquid, weighting agents, polyacrylate flow agents, diluents, viscosifiers, retarders, acids, and accelerators. Modifiers may be added to the LCM composition to modify one or more properties of the LCM composition, such as but not limited to viscosity, yield point (YP), plastic viscosity (PV), gel strength, density, or combinations of these.

In some embodiments, the cured bisphenol epoxy resin is a reaction product of a bisphenol epoxy resin system, comprising uncured bisphenol epoxy resin, one or more curing agents, and optionally, a diluent.

In some embodiments, the bisphenol epoxy resin system, the surfactants, and the carbon dioxide gas-generating compounds are combined to form a lost circulation material (LCM) precursor.

In some embodiments, the LCM precursor further comprises an epoxy resin portion, wherein the epoxy resin portion may comprise from 60 wt. % to 100 wt. % uncured bisphenol epoxy resin based on the total weight of the epoxy resin portion of the LCM precursor. As used in this disclosure, the term "epoxy resin portion" refers to the bisphenol epoxy resins and the diluents of the LCM precursor. The epoxy resin portion includes the epoxy resins and any added reactive or non-reactive diluents. In some embodiments, the epoxy resin portion may comprise from 60 wt. % to 100 wt. %, from 60 wt. % to 95 wt. %, from 60 wt. % to 90 wt. %, from 60 wt. % to 88 wt. %, from 60 wt. % to 86 wt. %, from 60 wt. % to 84 wt. %, from 60 wt. % to 82 wt. %, from 60 wt. % to 80 wt. %, from 60 wt. % to 78 wt. %, from 60 wt. % to 76 wt. %, from 60 wt. % to 74 wt. %, from 60 wt. % to 70 wt. %, from 70 wt. % to 100 wt. %, from 70 wt. % to 95 wt. %, from 70 wt. % to 90 wt. %, from 70 wt. % to 88 wt. %, from 70 wt. % to 86 wt. %, from 70 wt. % to 84 wt. %, from 70 wt. % to 82 wt. %, from 70 wt. % to 80 wt. %, from 70 wt. % to 78 wt. %, from 70 wt. % to 76 wt. %, from 70 wt. % to 74 wt. %, from 74 wt. % to 95 wt. %, from 74 wt. % to 90 wt. %, from 74 wt. % to 88 wt. %, from 74 wt. % to 86 wt. %, from 74 wt. % to 84 wt. %, from 74 wt. % to 82 wt. %, from 74 wt. % to 80 wt. %, from 74 wt. % to 78 wt. % from 80 wt. % to 100 wt. %, from 80 wt. % to 95 wt. %, from 80 wt. % to 90 wt. %, from 80 wt. % to 88 wt. %, from 80 wt. % to 86 wt. %, from 80 wt. % to 84 wt. %, from 84 wt. % to 100 wt. %, from 84 wt. % to 95 wt. %, from 84 wt. % to 90 wt. %, from 84 wt. % to 88 wt. %, or from 84 wt. % to 86 wt. % of uncured bisphenol epoxy resin based on the total weight of the epoxy resin portion of the of the LCM precursor. It should be understood that the total weight of the uncured bisphenol epoxy resin of the epoxy resin portion of the LCM precursor may be in a range formed from any one of the lower bounds for such specific total weight described herein to any one of the upper bounds for such specific total weight described herein.

In some embodiments, the epoxy resin portion of the LCM precursor may comprise from 0 wt. % to 40 wt. % diluent based on the total weight of the epoxy resin portion of the LCM precursor. In some embodiments, the diluent may modify one or more of the viscosity, adhesion, the flexibility, or the solvent resistance of the epoxy resin. In some embodiments, the epoxy resin portion may comprise from 0 wt. % to 40 wt. %, from 1 wt. % to 40 wt. %, from 1 wt. % to 35 wt. %, from 1 wt. % to 30 wt. %, from 1 wt. % to 25 wt. %, from 1 wt. % to 20 wt. %, from 1 wt. % to 16 wt. %, from 1 wt. % to 14 wt. %, from 1 wt. % to 12 wt. %, from 5 wt. % to 40 wt. %, from 5 wt. % to 35 wt. %, from 5 wt. % to 30 wt. %, from 5 wt. % to 25 wt. %, from 5 wt. % to 20 wt. %, from 5 wt. % to 16 wt. %, from 5 wt. % to 14 wt. %, from 5 wt. % to 12 wt. %, from 10 wt. % to 40 wt. %, from 10 wt. % to 35 wt. %, from 10 wt. % to 30 wt. %, from 10 wt. % to 25 wt. %, from 10 wt. % to 20 wt. %, from 10 wt. % to 16 wt. %, from 10 wt. % to 14 wt. %, from 12 wt. % to 40 wt. %, from 12 wt. % to 35 wt. %, from 12 wt. % to 30 wt. %, from 12 wt. % to 25 wt. %, from 12 wt. % to 20 wt. %, from 12 wt. % to 16 wt. %, from 14 wt. % to 40 wt. %, 14 wt. % to 35 wt. %, 14 wt. % to 30 wt. %, 14 wt. % to 25 wt. %, from 14 wt. % to 20 wt. %, from 14 wt. % to 16 wt. %, from 20 wt. % to 40 wt. %, from 20 wt. % to 35 wt. %, from 20 wt. % to 30 wt. %, or from 20 wt. % to 25 wt. % of the diluent based on the total weight of the epoxy resin portion of the LCM precursor. It should be understood that the total weight of the diluent of the epoxy resin portion of the LCM precursor may be in a range formed from any one of the lower bounds for such specific total weight described herein to any one of the upper bounds for such specific total weight described herein.

In some embodiments, the uncured bisphenol epoxy resin of the LCM precursor is bisphenol-A-(epichlorohydrin) epoxy resin. In some embodiments, the uncured bisphenol epoxy resin is 2,2'[(1-methylethylidene)bis(4,1-phenyleneoxymethylene)]bisoxirane epoxy resin. In some embodiments the uncured bisphenol epoxy resin comprises bisphenol-A-(epichlorohydrin) epoxy resin, 2,2'-[(1-methylethylidene)bis(4,1-phenyleneoxymethylene)] bisoxirane epoxy resin, or combinations of these. In some embodiments, the diluent has the structure $R^1$—O—$CH_2$—($C_2H_3O$), wherein $R^1$ is an alkyl having from 12 to 14 carbon atoms. In some embodiments the diluent is oxirane mono[($C_{12}$-$C_{14}$)-alkyloxy)methyl] derivatives. In some embodiments, the diluent is 1,6 hexanediol diglycidyl ether. In some embodiments the diluent comprises oxirane mono [($C_{12}$-$C_{14}$)-alkyloxy)methyl] derivatives, 1,6 hexanediol diglycidyl ether, or combinations of these. In some embodiments, the uncured epoxy resin system comprises bisphenol-A-(epichlorohydrin) epoxy resin and with oxirane mono [($C_{12}$-$C_{14}$ alkyloxy)methyl] derivatives. An exemplary epoxy resin that contains bisphenol-A-(epichlorohydrin) epoxy resin with oxirane mono [($C_{12}$-$C_{14}$ alkyloxy)methyl] derivatives is Razeen® 2254, sold by Jubail Chemical Industries Co. (JANA), Saudi Arabia. In some embodiments, the uncured epoxy resin system comprises 2,2'[(1-methylethylidene)bis(4,1-phenyleneoxymethylene)]bisoxirane epoxy resin and 1,6 hexanediol diglycidyl ether. An exemplary epoxy resin that contains 2,2'-[(1-methylethylidene)bis(4,1-phenyleneoxymethylene)]bisoxirane epoxy resin with the reactive diluent 1,6 hexanediol diglycidyl ether is Razeen® 2253, sold by Jubail Chemical Industries Co. (JANA), Saudi Arabia.

In some embodiments, the LCM precursor may comprise from 50 wt. % to 90 wt. % epoxy resin portion based on the total weight of the LCM precursor. In some embodiments, the LCM precursor may comprise from 50 wt. % to 90 wt. %, from 50 wt. % to 88 wt. %, from 50 wt. % to 86 wt. %, from 50 wt. % to 84 wt. %, from 50 wt. % to 82 wt. %, from 50 wt. % to 80 wt. %, from 50 wt. % to 78 wt. %, from 50 wt. % to 76 wt. %, from 50 wt. % to 74 wt. %, from 50 wt. % to 70 wt. %, from 50 wt. % to 68 wt. %, from 50 wt. % to 66 wt. %, from 50 wt. % to 64 wt. %, from 50 wt. % to 60 wt. %, from 50 wt. % to 55 wt. %, 55 wt. % to 90 wt. %, from 55 wt. % to 88 wt. %, from 55 wt. % to 86 wt. %, from 55 wt. % to 84 wt. %, from 55 wt. % to 82 wt. %, from 55 wt. % to 80 wt. %, from 55 wt. % to 78 wt. %, from 55 wt. % to 76 wt. %, from 55 wt. % to 74 wt. %, from 55 wt. % to 70 wt. %, from 55 wt. % to 68 wt. %, from 55 wt. % to 66 wt. %, from 55 wt. % to 64 wt. %, from 55 wt. % to 62 wt. %, from 55 wt. % to 60 wt. %, from 60 wt. % to 90 wt. %, from 60 wt. % to 88 wt. %, from 60 wt. % to 86 wt. %, from 60 wt. % to 84 wt. %, from 60 wt. % to 82 wt. %, from 60 wt. % to 80 wt. %, from 60 wt. % to 78 wt. %, from 60 wt. % to 76 wt. %, from 60 wt. % to 74 wt. %, from 60 wt. % to 70 wt. %, from 70 wt. % to 100 wt. %, from 70 wt. % to 95 wt. %, from 70 wt. % to 90 wt. %, from 70 wt. % to 88 wt. %, from 70 wt. % to 86 wt. %, from 70 wt. % to 84 wt. %, from 70 wt. % to 82 wt. %, from 70 wt. % to 80 wt. %, from 70 wt. % to 78 wt. %, from 70 wt. % to 76 wt. %, from 70 wt. % to 74 wt. %, from 74 wt. % to 95 wt. %, from 74 wt. % to 90 wt. %, from 74 wt. % to 88 wt. %, from 74 wt. % to 86 wt. %, from 74 wt. % to 84 wt. %, from 74 wt. % to 82 wt. %, from 74 wt. % to 80 wt. %, from 74 wt. % to 78 wt. % from 80 wt. % to 100 wt. %, from 80 wt. % to 95 wt. %, from 80 wt. % to 90 wt. %, from 80 wt. % to 88 wt. %, from 80 wt. % to 86 wt. %, from 80 wt. % to 84 wt. %, from 84 wt. % to 100 wt. %, from 84 wt. % to 95 wt. %, from 84 wt. % to 90 wt. %, from 84 wt. % to 88 wt. %, or from 84 wt. % to 86 wt. %. epoxy resin portion based on the total weight of the LCM precursor.

As previously discussed in this disclosure, the LCM precursor comprises a curing agent to cure the uncured bisphenol epoxy resin. As used throughout this disclosure, the term "cure" or "curing," when used in the context of the epoxy resin systems, may refer to the process of cross-linking the epoxy resin, which is in a liquid form initially, with a curing agent to form a semi-solid, solid, foamed semi-solid, or foamed solid cured epoxy resin. The curing agent may comprise at least one amine group. Curing agents with amine functional groups may comprise, but are not limited to, at least one of an amine, polyamine, amine adduct, polyamine adduct, alkanolamine, phenalkamines, or combinations of these. Amine or polyamine curing agents may comprise, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may comprise at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), diethyltoluenediamine (DE-TDA), polyoxypropylene diamine, or combinations of these. In one or more embodiments, the curing agent may comprise at least one of DETA, DETDA, polyoxypropylene diamine, or combinations of these. In one or more embodiments, the curing agent may be an ethyleneamine. The LCM precursor may comprise a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrochloric acid (HCl). The amine value may then be calculated from the amount of HCl needed to neutralize the amine in the solution according to Equation 1 (EQU. 1):

$$\frac{V_{HCl} * N_{HCl} * MW_{KOH}}{W} \qquad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (EQU. 2):

$$\frac{1000 * MW_{KOH}}{MW_{curing\ agent}} \qquad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

In some embodiments, the LCM precursor may comprise from 1 wt. % to 30 wt. % curing agent based on the total weight of the LCM precursor before curing, such as within 30 minutes of adding the curing agent to the LCM precursor. In one or more embodiments, the LCM precursor may comprise from 1 wt. % to 30 wt. %, from 1 wt. % to 25 wt. %, from 1 wt. % to 20 wt. %, from 1 wt. % to 15 wt. %, from 1 wt. % to 10 wt. %, from 2 wt. % to 30 wt. %, from 2 wt. % to 25 wt. %, from 2 wt. % to 20 wt. %, from 2 wt. % to 15 wt. %, from 2 wt. % to 10 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 30 wt. %, from 10 wt. % to 25 wt. %, from 10 wt. % to 20 wt. %, or from 10 wt. % to 15 wt. % curing agent based on the total weight of the LCM precursor before curing, such as within 30 minutes of adding the curing agent to the LCM precursor. An exemplary curing agent is RAZEENCURE® 931, a linear ethylene amine containing two primary nitrogens and one secondary nitrogen, sold by Jubail Chemical Industries Co. (JANA), Saudi Arabia.

In some embodiments, the LCM precursor comprises surfactants. In some embodiments, the surfactant is in an aqueous solution. In some embodiments, the surfactant is from 10 wt. % to 50 wt. % by weight of the aqueous solution. For example, the surfactant can be from 10 wt. % to 15 wt. %, from 10 wt. % to 20 wt. %, from 10 wt. % to 25 wt. %, from 10 wt. % to 30 wt. %, from 10 wt. % to 35 wt. %, from 10 wt. % to 40 wt. %, from 10 wt. % to 45 wt. %, from 10 wt. % to 50 wt. %, from 20 wt. % to 25 wt. %, from 20 wt. % to 30 wt. %, from 20 wt. % to 35 wt. %, from 20 wt. % to 40 wt. %, from 20 wt. % to 45 wt. %, from 20 wt. % to 50 wt. %, from 30 wt. % to 35 wt. %, from 30 wt. % to 40 wt. %, from 30 wt. % to 45 wt. %, from 30 wt. % to 50%, from 35 wt. % to 40 wt. %, from 35 wt. % to 45 wt. %, from 35 wt. % to 50%, from 40 wt. % to 45 wt. %, from 40 wt. % to 50 wt. %, or from 45 wt. % to 50 wt. % by weight of the aqueous solution. In some embodiments, the surfactant is an aqueous solution containing a hydroxysultaine. In some embodiments, the surfactant is an aqueous solution containing cocamidopropyl hydroxysultaine. In some embodiments, the surfactant is a 43 wt % solution of cocamidopropyl hydroxysultaine in water. An exemplary aqueous solution of cocamidopropyl hydroxysultaine is PETROSTEP® SB, sold by Stepan Company (Northfield, IL, USA).

In one or more embodiments, the LCM precursor may comprise a surfactant in an amount of from 0.1% to 5% by weight of the LCM precursor before curing, such as within 30 minutes of adding the curing agent to the LCM precursor. For example, the surfactant can be from 0.5% to 5% by weight of the LCM precursor such as from 0.5% to 4.5%, from 0.5% to 4%, from 0.5% to 3.5%, from 0.5% to 3%, from 0.5% to 2.5%, from 0.5% to 2%, from 0.5% to 1.5%, from 0.5% to 1%, from 1% to 5%, from 1% to 4.5%, from 1% to 4%, from 1% to 3.5%, from 1% to 3%, from 1% to 2.5%, from 1% to 2%, from 1% to 1.5%, from 1.5% to 5%, from 1.5% to 4.5%, from 1.5% to 4%, from 1.5% to 3.5%, from 1.5% to 3%, from 1.5% to 2.5%, from 1.5% to 2%, from 2% to 5%, from 2% to 4.5%, from 2% to 4%, from 2% to 3.5%, from 2% to 3%, from 2% to 2.5%, from 2.5% to 5%, from 2.5% to 4.5%, from 2.5% to 4%, from 2.5% to 3.5%, from 2.5% to 3%, from 3% to 5%, from 3% to 4.5%, from 3% to 4%, from 3% to 3.5%, from 3.5% to 5%, from 3.5% to 4.5%, from 3.5% to 4%, from 4% to 5%, from 4% to 4.5%, from 4.5% to 5%, or 0.1%, 0.5%, 1%, 1.5%, 2%, 2.5%, 2.6%, 3%, 3.5%, 4%, 4.5%, or 5% by weight of the LCM precursor before curing, such as within 30 minutes of adding the curing agent to the LCM precursor. In some embodiments, the LCM precursor contains 2% to 3% surfactant by weight of the LCM precursor, before curing. In some embodiments, the LCM precursor contains 2.7% surfactant by weight of the LCM precursor before curing. In some embodiments, the surfactant is cocamidopropyl hydroxysultaine. In some embodiments, the surfactant is an aqueous solution of cocamidopropyl hydroxysultaine.

As previously discussed, the LCM precursor comprises one or more carbon dioxide gas-generating compounds. As used throughout this disclosure, the term "carbon dioxide gas-generating compound" may refer to a material, compound, or formulation that results in the generation of carbon dioxide gas. The carbon dioxide gas-generating compounds may be sodium bicarbonate, baking powder, or other compounds. Without being bound by theory, it is believed that sodium bicarbonate decomposes upon heating and generates carbon dioxide gas as a reaction product. In some embodiments, any acid may be added with the carbon dioxide gas-generating compound to the LCM precursor. Additionally, it is believed that sodium bicarbonate decomposes in the presence of acid. For example, mixing sodium bicarbonate in the presence of acetic acid produces carbonic acid. Carbonic acid may subsequently decompose to generate carbon dioxide gas. Without being bound by any particular theory, it believed that the addition of acid with sodium bicarbonate may result in a LCM precursor that may form a foamed LCM composition without additional heating of the LCM precursor, or heating to a lower temperature compared to LCM precursors in the absence of an acid.

In some embodiments, the LCM precursor may comprise from 1 wt. % to 30 wt. % carbon dioxide gas-generating compounds based on the total weight of the LCM precursor before curing, such as within 30 minutes of adding the curing agent to the LCM precursor. In one or more embodiments, the LCM precursor may have from 1 wt. % to 30 wt. %, from 1 wt. % to 25 wt. %, from 1 wt. % to 20 wt. %, from 1 wt. % to 15 wt. %, from 1 wt. % to 10 wt. %, from 2 wt. % to 30 wt. %, from 2 wt. % to 25 wt. %, from 2 wt. % to 20 wt. %, from 2 wt. % to 15 wt. %, from 2 wt. % to 10 wt. %, from 5 wt. % to 30 wt %, from 5 wt. % to 25 wt %, from 5 wt. % to 20 wt %, from 5 wt. % to 15 wt %, from 5 wt. % to 10 wt %, from 10 wt. % to 30 wt %, from 10 wt. % to 25 wt %, from 10 wt. % to 20 wt %, from 10 wt. % to 15 wt %, from 15 wt. % to 30 wt %, from 15 wt. % to 25 wt %, from 15 wt. % to 20 wt %, from 20 wt. % to 30 wt %, from 20 wt. % to 25 wt %, or from 25 wt. % to 30 wt % carbon dioxide gas-generating compounds based on the total weight of the LCM precursor before curing, such as within 30 minutes of adding the curing agent to the LCM precursor.

The LCM precursor may be used for treating lost circulation zones in a wellbore under a range of different downhole conditions. For example, in some embodiments, the LCM precursor may be adapted to different downhole conditions by changing the concentrations of the epoxy resin, the curing agents, the one or more surfactants, or the one or more carbon dioxide gas-generating compounds in the LCM precursor to modify the specific gravity, viscosity, mechanical properties, curing time, volume, or other properties of the LCM compositions.

The LCM precursor may have a cure time that enables the LCM precursor to be transferred into the lost circulation zone in the formation before the buildup of viscosity during curing causes transfer problems, such as inability to pump the LCM precursor.

The curing time of the epoxy resin system may be inversely proportional to the amount of curing agent in the LCM precursor. For example, increasing the amount of the curing agent in the LCM precursor may decrease the curing time of the LCM precursor. The LCM precursor may comprise an amount of curing agent capable of curing the LCM precursor to a semi-solid state in a cure time of less than or equal to 48 hours, less than or equal to 24 hours, less than or equal to 12 hours, or even less than or equal to 8 hours.

As used in this disclosure, the term "semi-solid" refers to a state of the epoxy resin system that is between a liquid and a solid and in which the cured epoxy polymers exhibit greater elasticity and flexibility compared to an epoxy resin cured all the way to a rigid solid. In the semi-solid state, the LCM compositions containing the epoxy resin systems may be easily deformed but may return to shape upon releasing the deforming force. The LCM compositions that include the epoxy resin system cured to a semi-solid or solid state are capable of treating a lost circulation zone, such as a high-injectivity lost circulation zone.

Without intending to be bound by any particular theory, it is believed that that the presence of carbon dioxide and surfactants in the LCM precursor during the curing process results in a cured foamed LCM composition that has an increased volume compared to the uncured LCM precursor.

In one or more embodiments, the LCM precursor may comprise an amount of surfactant necessary for the extent of foaming desired in the LCM composition. For instance, the amount of surfactant used in the LCM precursor may be increased to increase the extent of foaming in the LCM composition. Alternatively, the amount of surfactant used in the LCM precursor may be decreased to decrease the extent of foaming in the LCM composition.

The extent of foaming in the LCM composition may be controlled by varying the concentration of the carbon dioxide gas-generating compound in the LCM precursor. The concentration of the carbon dioxide gas-generating compound in the LCM precursor may be increased or decreased depending on the characteristics of the lost circulation zone, such as but not limited to the porosity, fluid loss rate, injectivity factor, dimensions of the lost circulation zone, or combinations of these. As a non-limiting example, the concentration of carbon dioxide gas-generating compound in the LCM precursor may be increased for lost circulation zones having greater porosity or greater fluid loss rate and may be decreased for lost circulation zones having less porosity or lesser fluid loss rate.

In some embodiments, the LCM precursor may have a weight ratio of the carbon dioxide gas-generating compound to the surfactant of about 5:1 to about 1:5, such as about 4:1 to about 1:4, about 3:1 to about 1:3, about 2:1 to about 1:2, or about 1:1. For example, the LCM precursor may have a weight ratio of the carbon dioxide gas-generating compound to the surfactant of about 5:1, about 4.5:1, about 4:1, about 3.5:1, about 3:1, about 2.5:1, about 2:1, about 1.5:1, about 1:1, about 1:1.5, about 1:2, about 1:2.5, about 1:3, about 1:3.5, about 1:4, about 1:4.5, or about 1:5. In some embodiments, the LCM precursor may have a ratio of carbon dioxide gas-generating compound to surfactant of about 2:1. In some embodiments, the carbon dioxide gas-generating compound is sodium bicarbonate. In some embodiments, carbon dioxide gas-generating compound is baking powder. In some embodiments, the surfactant is a sultaine. In some embodiments, the surfactant is cocamidopropyl hydroxysultaine. In some embodiments, the composition contains baking soda and cocamidopropyl hydroxysultaine in a weight ratio of about 2:1.

Also provided herein is a method of servicing a lost circulation zone. In some embodiments, the lost circulation zone is fluidly connected to a wellbore. The method may comprise providing the LCM precursor within a portion of a subterranean formation containing the lost circulation zone; and forming the foamed LCM composition.

In some embodiments of the methods of the present disclosure, the LCM precursor is introduced into a subterranean formation containing the lost circulation zone using a pump.

In some embodiments, the LCM compositions may be more chemically resistant than conventional cement compositions. For example, the fluids from the subterranean formation, such as hydrocarbon gases, crude oil, or produced water, may include hydrogen sulfide gas ($H_2S$), which is highly corrosive. In some embodiments, the LCM compositions of the present disclosure may be resistant to corrosion caused by $H_2S$ gas present in fluids in the subterranean formation.

The LCM compositions may be capable of withstanding a wide range of temperatures and pressures without failing or substantially deteriorating, which would allow liquids or gases to penetrate into or through the LCM compositions. For example, the LCM composition may be effective for lost circulation prevention at ranging temperatures, as described herein. The LCM compositions may be used at temperatures ranging from about 150° F. to about 450° F., such as about 150° F. to about 400° F., about 150° F. to about 350° F., about 150° F. to about 300° F., about 150° F. to about 250° F., about 150° F. to about 200° F., about 170° F. to about 400° F., about 170° F. to about 350° F., about 170° F. to about 300° F., about 170° F. to about 250° F., about 170° F. to about 200° F., about 175° F. to about 450° F., about 175° F. to about 400° F., about 175° F. to about 350° F., about 175° F. to about 300° F., about 175° F. to about 250° F., about 175° F. to about 200° F., about 200° F. to about 450° F., about 200° F. to about 400° F., about 200° F. to about 350° F., about 200° F. to about 300° F., about 200° F. to about 250° F., about 250° F. to about 450° F., about 250° F. to about 400° F., about 250° F. to about 350° F., about 250° F. to about 300° F., about 300° F. to about 450° F., about 300° F. to about 400° F., about 300° F. to about 350° F., about 350° F. to about 450° F., about 350° F. to about 400° F., or about 400° F. to about 450° F. In some embodiments, the foamed LCM compositions are formed at elevated temperatures, such as at or above about 170° F. or at or above about 200° F., or up to about 450° F. In some embodiments, the foamed LCM composition forms at a temperature below 85° F. In some embodiments, the foamed LCM composition forms at a temperature below 95° F. In some embodiments, the foamed LCM composition does not form at a temperature below 95° F. In some embodiments, the foamed LCM composition does not form at a temperature below 150° F. In some embodiments, the foamed LCM composition does not form at a temperature below 170° F. For instance, the addition of an acid to the LCM precursor may reduce the temperature at which a foamed LCM composition may form. Without being bound by any particular theory, it is believed that an increase in the concentration of an acid in the LCM precursor may lower the temperature at which the carbon dioxide gas-generating compound may decompose to produce carbon dioxide.

In some embodiments, a method of treating a lost circulation zone in a wellbore may include positioning an LCM composition according to the present disclosure in the lost circulation zone to produce a barrier operable to prevent wellbore fluids from passing into the lost circulation zone. The LCM composition may be a foam comprising a gas phase and a liquid phase. The LCM composition may comprise a cured bisphenol epoxy resin, wherein the cured bisphenol epoxy resin is a reaction product of an uncured bisphenol epoxy resin, a curing agent, and optionally, a diluent. The LCM composition may comprise one or more surfactants positioned at the interface of the liquid phase and the gas phase of the foam, and carbon dioxide in the gas phase of the foam, wherein the carbon dioxide is a reaction product of one or more carbon dioxide gas-generating compounds. The cured bisphenol epoxy resin may include at least one of bisphenol-A-epichlorohydrin epoxy resin, or 2,2'-[(1-methylethylidene)bis(4,1-phenyleneoxymethylene)]bisoxirane. The epoxy resin may include one or more than one of the epoxy resins described in this disclosure. The surfactants may include one or a plurality of the surfactants described in this disclosure.

In some embodiments, the use of the LCM compositions of the present disclosure decreases the amount of lost circulation material required to plug vugular zones as compared to traditional lost circulation materials that are not able to expand and adapt in volume. Lost circulation zones such as vugular zones are difficult to plug due to the high volume of lost circulation materials required to plug them. In the case of conventional, non-foaming epoxy resins used as lost circulation materials, a high volume of conventional and resin material would be required to plug vugular zones with non-foaming LCM compositions. Thus, in some embodiments of the provided methods, the foamed LCM compositions of the present disclosure cure the losses in vugular zones while using less material than traditional LCM compositions.

In some embodiments, the LCM composition may include any other constituent, property, or characteristic previously described in this disclosure for the LCM compositions. The lost circulation zone may be isolated from the other portions of the wellbore by the cured LCM composition.

The wellbore forms a pathway capable of permitting both fluids and apparatus to traverse between the surface and the hydrocarbon-bearing formation. Besides defining the void volume of the wellbore, the wellbore wall also acts as the interface through which fluid can transition between the subterranean formation and the interior of the well bore. The wellbore wall can be unlined (that is, bare rock or formation) to permit such interaction with the formation or lined, such as by a tubular string, so as to prevent such interactions.

The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors, and flares. The fluid conduit may be large enough to permit introduction and removal of mechanical devices, including but not limited to tools, drill strings, sensors, and instruments, into and out of the interior of the well bore.

The wellbore may be drilled using a drill string in the presence of a drilling fluid. While drilling the wellbore, the drilling operation may encounter a lost circulation zone. When a lost circulation zone is encountered during drilling, fluids in the wellbore flow from the wellbore into the subterranean formation, resulting in loss of these fluids. These fluids can include but are not limited to drilling fluids, sealing compositions, spacer fluids, wash fluids, pre-flush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. The subterranean formation may also include caves, caverns, tunnels, or other voids in the formation capable of receiving fluids from the wellbore. Alternatively, in other circumstances, the hydrostatic pressure of the fluids in the wellbore may be greater than the fracture gradient of the subterranean formation, which may cause at least some breakdown of the pores in the formation. If the pores in the formation breakdown, then the pores may become large enough to reduce the resistance to flow of fluids into and through the pores, which may result in the formation receiving fluids from the wellbore instead of resisting the flow of these fluids into the formation.

The method may further include introducing a spacer fluid into the lost circulation zone before introducing the LCM precursor. As used throughout the disclosure, "spacer fluid" may refer to a fluid utilized to space apart any two other materials utilized in well production. In some embodiments, the LCM precursor may not be compatible with the drilling fluid or other fluid present in the wellbore. The spacer fluid may displace the fluid present in the wellbore before the LCM precursor is pumped into the well bore. The spacer fluid may maintain the LCM precursor separate from the fluids already present in the wellbore to reduce or prevent degradation of the LCM precursor, fluid in the wellbore or both. The spacer fluid may be compatible with the fluids present in the wellbore as well as the LCM precursor. The method may further include introducing a displacement fluid after the LCM precursor to displace the LCM precursor into the lost circulation zone. The displacement fluid may push the LCM precursor into the lost circulation to increase the amount of LCM precursor in the lost circulation zone and reduce curing of the LCM precursor in the wellbore, in particular in completed portions of the wellbore closer to the surface. In some embodiments, a packer may be utilized to direct placement of the LCM composition into the lost circulation zone. The method may further include drilling through at least a portion of the barrier formed by the LCM composition to continue drilling the wellbore. In some embodiments, one or more subsequent treatments with the LCM precursor may be conducted to fully treat the lost circulation zone.

surfactant, and 1 gram of baking soda; and Example 1B, which includes 15 grams of the modified liquid bisphenol epoxy resin and 2.25 grams of the curing agent. The modified liquid bisphenol epoxy resin is commercially available as Razeen® LR 2254 from Jana Company. Razeen® LR 2254 is a low viscosity epoxy resin based on bishpenol A and modified with an aliphatic monoglycidyl ether; Razeen® LR 2254 is bishphenol-A-(epichlorhydrin) epoxy resin (84-86%; CAS-No. 25068-38-6) with the reactive diluent oxirane mono[($C_{12-14}$)-alkyloxy)methyl] derivatives (14-18%; CAS-No. 68609-97-2) (Resin 1). RAZEENCURE® 931 is diethylenetriamine (DETA). The surfactant is an aqueous solution of 50 wt. % cocoamidopropyl hydroxysultaine commercially available as PETROSTEP® SB from Stepan Company. Each sample is stirred for 2 minutes using a glass rod and then placed in a water bath at a temperature of 170 degrees Fahrenheit (° F.) (76.7° C.) for 2 hours. The volume of each sample after curing is reported in Table 2.

TABLE 2

Observations after Cure Time for Resin 1

| Sample ID | Resin | Curing agent | Quantity of Resin (g) | Quantity of Curing Agent (g) | Quantity of Surfactant (g) | Quantity of Baking Soda (g) | Observation |
|---|---|---|---|---|---|---|---|
| 1A | Resin 1 | DETA | 15 | 2.25 | 0.5 | 1 | Volume of 42 mL after 2 hrs |
| 1B | Resin 1 | DETA | 15 | 2.25 | 0 | 0 | Volume of 17.5 mL after 2 hrs |

EXAMPLES

The various embodiments of the present disclosure will be further clarified by the following examples. The examples are illustrative in nature, and should not be understood to limit the embodiments of the present disclosure. In these examples two epoxy resins were evaluated for use in the embodiments described in the present disclosure. Table 1 is subsequently included in this disclosure and provides a cross-reference for the epoxy resins utilized.

TABLE 1

Cross-Reference of Epoxy Resins

| Epoxy Resin ID | Epoxy Resin Name |
|---|---|
| Resin 1 | bisphenol-A-epichlorohydrin epoxy resin with the reactive diluent oxirane mono [($C_{12}$-$C_{14}$)-alkyloxy)methyl] derivatives |
| Resin 2 | 2,2'-[(1-methylethylidene)bis(4,1-phenyleneoxymethylene)]bisoxirane epoxy resin with the reactive diluent 1,6 hexanediol diglycidyl ether. |

Example 1

Figure 2A:
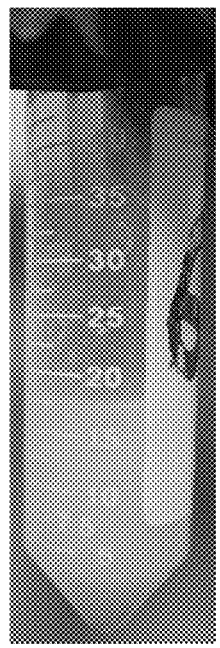
FIGS. 2A and 2B show images of example epoxy resin compositions, according to one or more embodiments described herein.
Figure 2B:
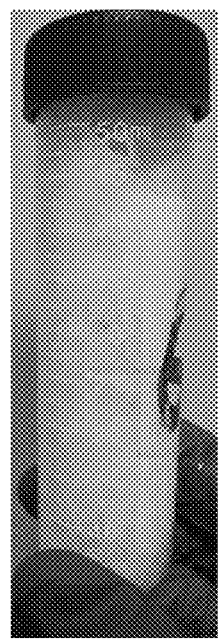

In example 1, the effect the carbon dioxide gas-generating compound and surfactant have on the bisphenol epoxy resin upon curing is observed. Specifically, two bisphenol epoxy resin samples are prepared: Example 1A, which includes 15 grams of a modified liquid bisphenol epoxy resin, 2.25 grams of a curing agent (commercially available as RAZEENCURE® 931 from Jana Company), 0.5 grams of a As shown in Table 2 and FIG. 1, after 2 hours in the 170° F. water bath, the control (Sample 1B) does not exhibit an increase in volume of the cured (hardened) resin. FIGS. 2A and 2B show the sample 1A resin containing the surfactant and baking soda just after mixing (FIG. 2A) and after 2 hours in the 170° F. (76.7° C.) water bath (FIG. 2B). The resin has significantly expanded and the volume increases from 17.5 mL to 42 mL after 2 hours as compared to the control sample after 2 hours in the same conditions.

Example 2

In example 2, the effect the carbon dioxide gas-generating compound and surfactant have on the bisphenol epoxy resin upon curing is also observed. Specifically, two bisphenol epoxy resin samples are prepared: Example 2A, which includes 15 grams of a modified liquid bisphenol epoxy resin, 2.25 grams of a curing agent (commercially available as RAZEENCURE 931 from Jana Company), 0.5 grams of a surfactant, and 1 gram of baking soda; and Example 2B, which includes 15 grams of the modified liquid bisphenol epoxy resin and 2.25 grams of the curing agent. The modified liquid bisphenol epoxy resin is commercially available as Razeen® LR 2253 from Jana Company. Razeen® LR 2253 is a low viscosity epoxy resin based on bishpenol A and modified with an aliphatic diglycidyl ether; Razeen® LR 2253 is 2,2'-[(1-methylethylidene)bis(4,1-phenyleneoxymethylene)]bisoxirane (70-90 wt. %; CAS-No. 1675-54-3) with the reactive diluent 1,6 hexanediol diglycidyl ether (10-30 wt. %; CAS-No. 933999-84-9) (Resin 2). RAZEENCURE 931 is diethylenetriamine (DETA). The surfactant is an aqueous solution of 50 wt. % cocoamidopropyl hydroxysultaine commercially available as PETROSTEP® SB from Stepan Company. Each sample is allowed to cure at a constant temperature of 150° F. for 2 hours. The volume of each sample after curing is reported in Table 3.

TABLE 3

Observations after Cure Time for Resin 2

| Sample ID | Resin | Curing agent | Quantity of Resin (g) | Quantity of Curing Agent (g) | Quantity of Surfactant (g) | Quantity of Baking Soda (g) | Observation |
|---|---|---|---|---|---|---|---|
| 2A | Resin 2 | DETA | 15 | 2.25 | 0.5 | 1 | Volume of 42.5 mL after 2 hrs |
| 2B | Resin 2 | DETA | 15 | 2.25 | 0 | 0 | Volume of 17 mL after 2 hrs |

As shown in Table 3, after 2 hours in the 150° F. water bath, the control (Sample 2B) did not exhibit an increase in volume of the cured (hardened) resin. On the contrary, the example (Sample 2A) significantly expanded and the volume increased from 17 mL to 42.5 mL after 2 hours as compared to the control sample after 2 hours in the same conditions.

According to an aspect, either alone or in combination with any other aspect, a method of treating a lost circulation zone includes positioning a cured lost circulation material composition in the lost circulation zone of a subterranean natural resource well to produce a barrier operable to mitigate wellbore fluids from passing into the lost circulation zone. The cured lost circulation material composition is a foam comprising a gas phase and a liquid phase. The cured lost circulation material composition includes a cured bisphenol epoxy resin, one or more surfactants positioned at the interface of the liquid phase and the gas phase of the foam, and carbon dioxide in the gas phase of the foam. The cured bisphenol epoxy resin is a reaction product of a bisphenol epoxy resin system comprising uncured bisphenol epoxy resin, one or more curing agents, and optionally, a diluent. The carbon dioxide is a reaction product of one or more carbon dioxide gas-generating compounds.

According to a second aspect, either alone or in combination with any other aspect, the cured bisphenol epoxy resin comprises bisphenol-A-epichlorohydrin epoxy resin, 2,2'-[(1-methylethylidene)bis(4,1-phenyleneoxymethylene)]bisoxirane, or combinations of these.

According to a third aspect, either alone or in combination with any other aspect, the bisphenol epoxy resin system comprises the diluent, wherein the diluent has the structure $R^1$—O—$CH_2$—($C_2H_3O$), and wherein $R^1$ is an alkyl having from 12 to 14 carbon atoms.

According to a fourth aspect, either alone or in combination with any other aspect, the bisphenol epoxy resin system comprises the diluent, and wherein the diluent is 1,6 hexanediol diglycidyl ether.

According to a fifth aspect, either alone or in combination with any other aspect, one or more of the surfactants is a hydroxysultaine.

According to a sixth aspect, either alone or in combination with any other aspect, one or more of the surfactants is cocoamidopropyl hydroxysultaine.

According to a seventh aspect, either alone or in combination with any other aspect, a method of treating a lost circulation zone further includes combining the bisphenol epoxy resin system, the surfactants, and the carbon dioxide gas-generating compounds to form a lost circulation material precursor.

According to an eighth aspect, either alone or in combination with any other aspect, the uncured bisphenol epoxy resin and the optional diluent of the bisphenol epoxy resin system define an epoxy resin portion of the lost circulation material precursor. The lost circulation material precursor comprises from 60 weight percent to 90 weight percent of the epoxy resin portion based on the total weight of the lost circulation material precursor.

According to a ninth aspect, either alone or in combination with any other aspect, the lost circulation material precursor comprises from 5 weight percent to 15 weight percent of the one or more curing agents based on the total weight of the lost circulation material precursor.

According to a tenth aspect, either alone or in combination with any other aspect, the lost circulation material precursor comprises from 1 weight percent to 5 weight percent surfactants based on the total weight of the lost circulation material precursor.

According to a eleventh aspect, either alone or in combination with any other aspect, the lost circulation material precursor comprises from 5 weight percent to 15 weight percent carbon dioxide gas-generating compounds based on the total weight of the lost circulation material precursor.

According to a twelfth aspect, either alone or in combination with any other aspect, the curing agent comprises trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine, or combinations of these.

According to a thirteenth aspect, either alone or in combination with any other aspect, the carbon dioxide gas-generating compound comprises sodium bicarbonate.

According to a fourteenth aspect, either alone or in combination with any other aspect, the epoxy resin system includes the diluent, the uncured bishphenol epoxy resin is bisphenol-A-epichlorohydrin epoxy resin, the diluent is oxirane mono [($C_{12}$-$C_{14}$)-alkyloxy)methyl] derivatives, and one or more of the surfactants is cocoamidopropyl hydroxysultaine.

According to a fifteenth aspect, either alone or in combination with any other aspect, the epoxy resin system includes the diluent, the uncured bishphenol epoxy resin is 2,2'[(1-methylethylidene)bis(4,1-phenyleneoxymethylene)]bisoxirane, the diluent is 1,6 hexanediol diglycidyl ether, and one or more of the surfactants is cocoamidopropyl hydroxysultaine.

It will be apparent to persons of ordinary skill in the art that various modifications and variations can be made without departing from the scope of the present disclosure. Since modifications, combinations, sub-combinations, and variations of the disclosed embodiments, which incorporate the spirit and substance of the present disclosure, may occur to persons of ordinary skill in the art, the scope of the present disclosure should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of treating a lost circulation zone of a subterranean natural resource well, the method comprising:
    positioning a cured lost circulation material composition in the lost circulation zone to produce a barrier operable to mitigate wellbore fluids from passing into the lost circulation zone, wherein the cured lost circulation material composition is a foam comprising a gas phase and a liquid phase, and wherein the cured lost circulation material composition comprises:
       a cured bisphenol epoxy resin, wherein the cured bisphenol epoxy resin is a reaction product of a bisphenol epoxy resin system comprising uncured bisphenol epoxy resin, one or more curing agents, and optionally, a diluent;
       one or more surfactants positioned at the interface of the liquid phase and the gas phase of the foam; and
       carbon dioxide in the gas phase of the foam, wherein the carbon dioxide is a reaction product of one or more carbon dioxide gas-generating compounds.

2. The method of claim 1, wherein the cured bisphenol epoxy resin comprises bisphenol-A-epichlorohydrin epoxy resin, 2,2'-[(1-methylethylidene)bis(4,1-phenyleneoxymethylene)]bis oxirane, or combinations of these.

3. The method of claim 1, wherein the bisphenol epoxy resin system comprises the diluent, wherein the diluent has the structure $R^1$—O—$CH_2$—$(C_2H_3O)$, and wherein $R^1$ is an alkyl having from 12 to 14 carbon atoms.

4. The method of claim 1, wherein the bisphenol epoxy resin system comprises the diluent, and wherein the diluent is 1,6 hexanediol diglycidyl ether.

5. The method of claim 1, wherein one or more of the one or more surfactants is a hydroxysultaine.

6. The method of claim 1, wherein one or more of the one or more surfactants is cocoamidopropyl hydroxysultaine.

7. The method of claim 1, further comprising combining the bisphenol epoxy resin system, the one or more surfactants, and the one or more carbon dioxide gas-generating compounds to form a lost circulation material precursor.

8. The method of claim 7, wherein:
    the uncured bisphenol epoxy resin and the optional diluent of the bisphenol epoxy resin system define an epoxy resin portion of the lost circulation material precursor; and
    the lost circulation material precursor comprises from 60 weight percent to 90 weight percent of the epoxy resin portion based on the total weight of the lost circulation material precursor.

9. The method of claim 7, wherein the lost circulation material precursor comprises from 5 weight percent to 15 weight percent of the one or more curing agents based on the total weight of the lost circulation material precursor.

10. The method of claim 7, wherein the lost circulation material precursor comprises from 1 weight percent to 5 weight percent of the one or more surfactants based on the total weight of the lost circulation material precursor.

11. The method of claim 7, wherein the lost circulation material precursor comprises from 5 weight percent to 15 weight percent of the one or more carbon dioxide gas-generating compounds based on the total weight of the lost circulation material precursor.

12. The method of claim 1, wherein the one or more curing agents comprise trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine, or combinations of these.

13. The method of claim 1, wherein the one or more carbon dioxide gas-generating compounds comprise sodium bicarbonate.

14. The method of claim 1, wherein:
the epoxy resin system comprises the diluent;
the uncured bishphenol epoxy resin is bisphenol-A-epichlorohydrin epoxy resin;
the diluent is oxirane mono [($C_{12}$-$C_{14}$)-alkyloxy)methyl] derivatives; and
one or more of the one or more surfactants is cocoamidopropyl hydroxysultaine.

15. The method of claim 1, wherein:
the epoxy resin system comprises the diluent;
the uncured bishphenol epoxy resin is 2,2'-[(1-methylethylidene)bis(4,1-phenyleneoxymethylene)]bisoxirane;
the diluent is 1,6 hexanediol diglycidyl ether; and
one or more of the one or more surfactants is cocoamidopropyl hydroxysultaine.

16. A method of treating a lost circulation zone of a subterranean natural resource well, the method comprising:
positioning a cured lost circulation material composition in the lost circulation zone to produce a barrier operable to mitigate wellbore fluids from passing into the lost circulation zone, wherein the cured lost circulation material composition is a foam comprising a gas phase and a liquid phase, and wherein the cured lost circulation material composition comprises:
a cured bisphenol epoxy resin, wherein the cured bisphenol epoxy resin is a reaction product of a bisphenol epoxy resin system comprising uncured bisphenol epoxy resin and one or more curing agents;
one or more surfactants positioned at the interface of the liquid phase and the gas phase of the foam; and
carbon dioxide in the gas phase of the foam, wherein the carbon dioxide is a reaction product of one or more carbon dioxide gas-generating compounds.

17. The method of claim 16, wherein the cured bisphenol epoxy resin comprises bisphenol-A-epichlorohydrin epoxy resin, 2,2'-[(1-methylethylidene)bis(4,1-phenyleneoxymethylene)]bisoxirane, or combinations of these.

18. The method of claim 16, wherein the bisphenol epoxy resin system further comprises a diluent, wherein the diluent has the structure $R^1$—O—$CH_2$—($C_2H_3O$), and wherein $R^1$ is an alkyl having from 12 to 14 carbon atoms.

19. The method of claim 16, wherein the bisphenol epoxy resin system further comprises a diluent, and wherein the diluent is 1,6 hexanediol diglycidyl ether.

20. The method of claim 16, wherein one or more of the one or more surfactants is a hydroxysultaine.

* * * * *